Figure 1:
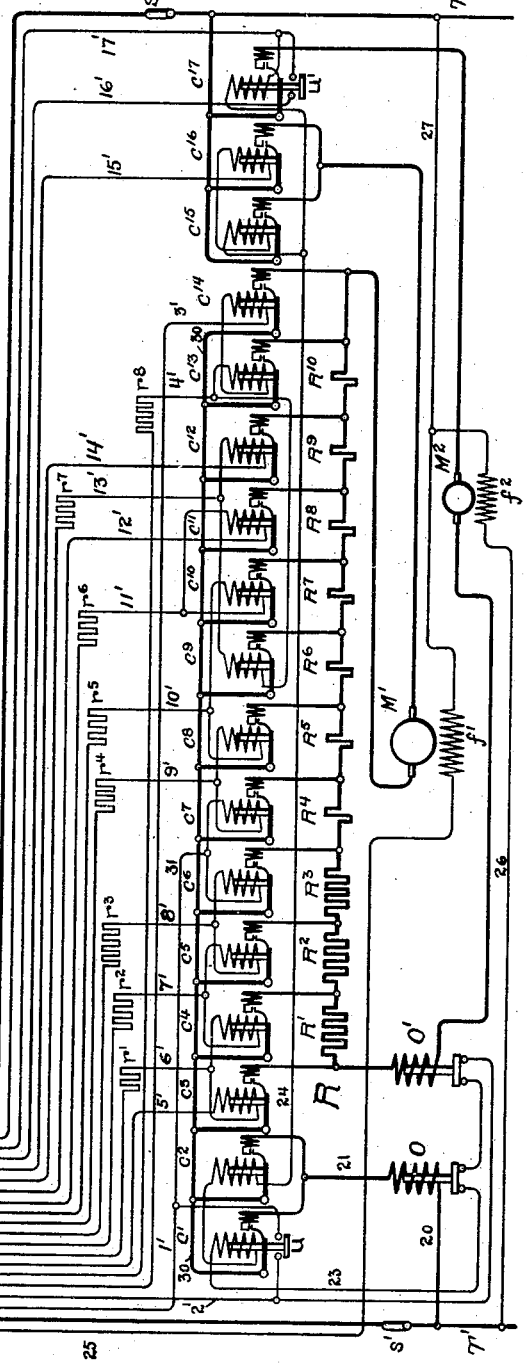
Figure 1:
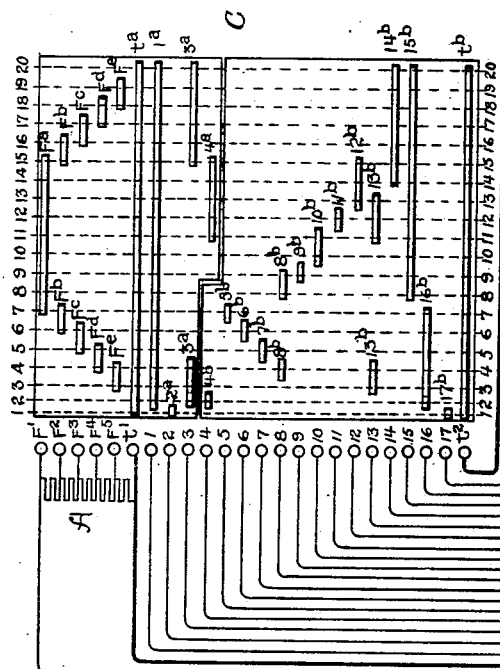

No. 739,577. PATENTED SEPT. 22, 1903.
C. E. BARRY & W. O. MUNDY.
MOTOR CONTROL SYSTEM.
APPLICATION FILED MAY 8, 1902.
NO MODEL. 2 SHEETS—SHEET 1.

WITNESSES:
Robt E Chapman
Helen A Ford

INVENTORS:
Charles E. Barry.
William O. Mundy.
by Allen S. Davis Atty.

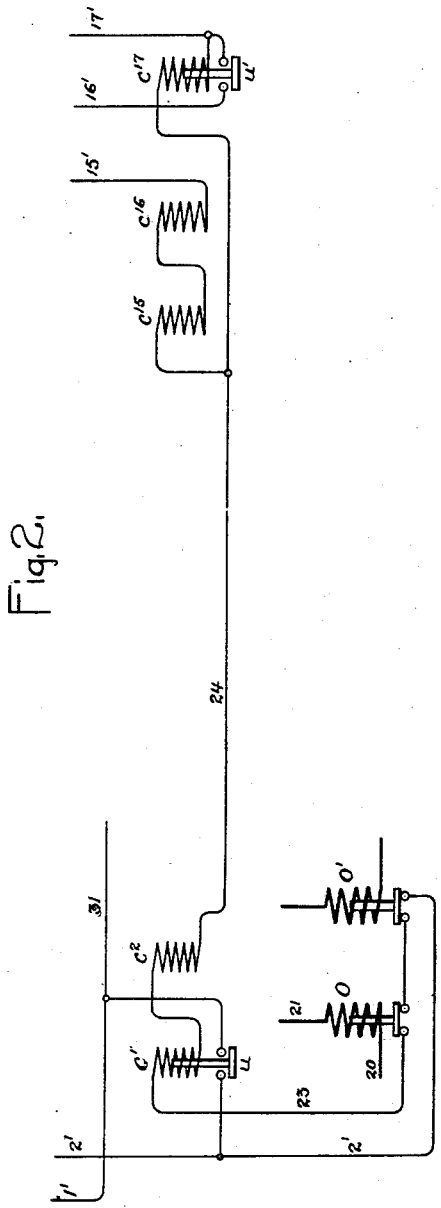
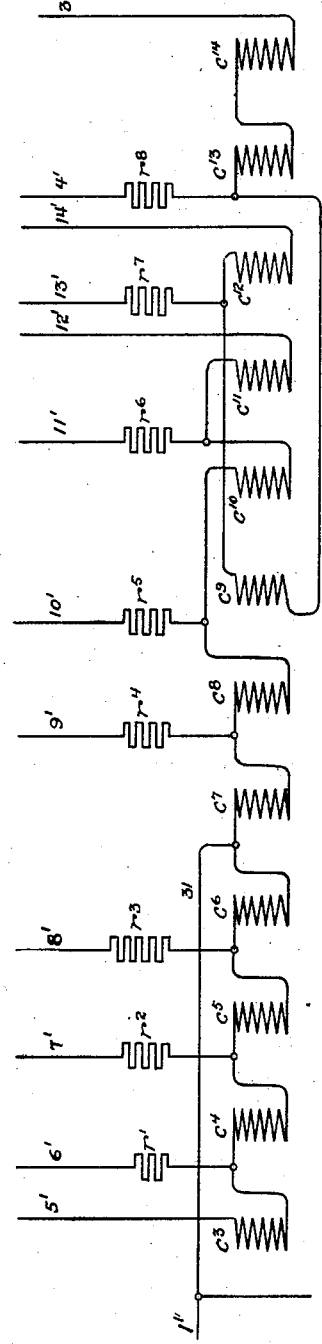

No. 739,577. Patented September 22, 1903.

UNITED STATES PATENT OFFICE.

CHARLES E. BARRY AND WILLIAM O. MUNDY, OF SCHENECTADY, NEW YORK, ASSIGNORS TO GENERAL ELECTRIC COMPANY, A CORPORATION OF NEW YORK.

MOTOR-CONTROL SYSTEM.

SPECIFICATION forming part of Letters Patent No. 739,577, dated September 22, 1903.

Application filed May 8, 1902. Serial No. 106,384. (No model.)

*To all whom it may concern:*

Be it known that we, CHARLES E. BARRY and WILLIAM O. MUNDY, citizens of the United States, residing at Schenectady, county of Schenectady and State of New York, have invented certain new and useful Improvements in Motor-Control Systems, of which the following is a specification.

Our invention relates to those systems of control for electric motors in which the motor-controller is actuated from a so-called "master-controller" situated at a point removed from the motor-controller, and is especially adapted to the control of large printing-presses, calenders, machine-tools, &c.

More particularly, our invention relates to those systems of motor control in which a number of electromagnetically-actuated devices are employed either directly or indirectly to operate the contacts of the motor-controller and in which a plurality of motors are controlled, so as to give a wide range of speed variation. In the control of a large printing-press, for instance, it is necessary to run the press at a slow speed when threading in the paper and at the same time to have the driving medium under perfect control, so that it will respond instantly and accurately to the controller. During the process of threading in the paper but a comparatively small amount of power is necessary. When the press is prepared, the speed is gradually increased up to normal working speed, and at this time a considerable amount of power is necessary. It has been customary in driving large presses by electric power to use a small motor for running the press during the threading-in process and then to use a larger motor for driving the press at its normal working speed, controlling the motors by independent rheostats.

The main object of our invention is to provide a system of control for a plurality of motors which will have a great range of speed variation and which will be under the control of a single operating-handle.

A further object of our invention is to provide such a system with an adjustable resistance or rheostat so constructed and arranged that it may be used in whole or in part in each motor-circuit successively.

A further object of our invention is to protect more efficiently the motors of different capacity in such a system from injury due to an overload or sudden rush of current after a loss of voltage.

Our invention comprises a system of motor control in which a plurality of motors are operated independently from a single controller and in which system a single rheostat is used successively in each of the motor-circuits.

In a more specific aspect our invention consists of a system of motor control in which a main motor and an auxiliary motor of smaller capacity than the main motor are operated independently from a motor-controller, which in turn is under the control of a master-controller, so that the motor-controller may be controlled from any desired distant point and in which system a single rheostat is used successively in each of the motor-circuits, the rheostat being constructed of high and low resistance sections so arranged relative to the controller that the desired amount of resistance may be inserted in each of the motor-circuits successively to produce a uniform acceleration of the machine or device to which the motors are applied as the said motors are successively connected into circuit with said resistance.

Our invention further contemplates the use of independent overload and underload circuit-opening devices to protect the motors independently by opening the master-controller circuit in case of an overload or an underload in the motor-circuits, thereby causing the motor-circuits to open at the motor-controller.

In the accompanying drawings, Figure 1 represents diagrammatically a control system embodying our invention. Fig. 2 represents diagrammatically the main master-control circuit, which is opened by the overload and underload switches; and Fig. 3 represents diagrammatically the control-circuits for varying the resistance of the rheostat.

Referring to the drawings, $c'$ to $c^{17}$, inclusive, indicate the various elements of a motor-controller of the separately-actuated contact type. Each of these elements comprises a pair of switch-contacts connected to a power-circuit and an actuating coil or winding connected to a controlling-circuit leading to the master-controller C. The construction and arrangement of the several elements of the motor-controller constitute no part of our invention, as they are now well known. These elements are illustrated only diagrammatically in this case, since they may evidently have any desired construction and arrangement—as, for example, that shown in patent to Perry, No. 687,060, dated November 19, 1901.

$T'$ and $T^2$ represent the positive and negative mains, respectively, and $s'$ and $s^2$ switches in the control-circuits leading from said mains. The auxiliary starting-motor $M^2$ has its field $f^2$ connected directly across the mains $T'$ and $T^2$. The main motor $M'$ has its field $f'$ connected across the mains $T'$ and $T^2$ through the resistances A, which are controlled by the master-controller C. Located in the main-motor circuit is the actuating-coil of an overload circuit-breaker O, which is adapted to open the controller-circuit, which includes the actuating-coils of the elements $c'$ and $c^2$ of the motor-controller, thereby allowing the motor-circuit to be opened at these elements in case of an excessive flow of current in the main-motor circuit. Located in the auxiliary-motor circuit is the actuating-coil of an overload circuit-breaker $O'$, which is adapted to protect the auxiliary motor by opening the said controller-circuit in case of an excess of current in the auxiliary-motor circuit. Attached to the plungers of the elements $c'$ and $c^{17}$, respectively, are underload-switches $u$ and $u'$, which are operated whenever the said elements are operated and are adapted to open the controller-circuit whenever there is a loss of current in the said circuit and to prevent closure of a circuit through either motor until the master-controller has moved back to its initial or first operative position.

The fixed contacts of the master-controller C are represented by $F'$ to $F^5$, inclusive, $t'$, 1 to 17, inclusive, and $t^2$, and the movable contacts are shown in development in the customary manner and are designated by $F^a$, $F^b$, $F^c$, $F^d$, $F^e$, $t^a$, $1^a$ to $4^a$, inclusive, $4^b$ to $17^b$, inclusive, and $t^b$. The various operative positions of the master-controller are indicated by 1 1 to 20 20, inclusive.

$r'$ to $r^8$, inclusive, represent resistances in the controller-circuit, and $R'$ to $R^{10}$, inclusive, represent the resistance-sections of the rheostat R, which are adapted to be inserted in the motor-circuits. The rheostat R is constructed with high-resistance sections at one end and low-resistance sections at the other end. In the system illustrated, in which a motor $M^2$ of small capacity is used for starting the machine, a high resistance is required in circuit when starting the auxiliary motor, while a much lower resistance should be used in starting the main motor. For the particular installation illustrated, which is intended for driving a printing-press, the rheostat should have a resistance of approximately three ohms when sections $R'$ to $R^{10}$, inclusive, are in circuit with the motor of small capacity and a resistance of approximately one ohm when the sections $R^4$ to $R^{10}$, inclusive, are connected in circuit with the motor of large capacity, this being the maximum number of sections ever in circuit with the main motor. The sections of rheostat R are so proportioned and arranged that they may be connected in circuit with each of said motors, respectively, to produce a uniform acceleration in the machine to which said motors are attached as said motors are successively connected in circuit with said rheostat, as will be hereinafter explained.

In operation when the main-line switch (not shown) and the switches $s'$ and $s^2$ are closed the fields of the motors are energized, the field $f^2$ of the auxiliary motor through the conductors 26 and 27 directly across the mains and the field $f'$ of the main motor through the resistances A, conductors 25 and 27 across the mains. When the master-controller is moved into its first operative position, (represented by 1 1,) current flows through the first controller-circuit, as follows: from main $T'$ through fixed contact $t'$, movable contacts $t^a$ and $2^a$, fixed contact 2, conductor $2'$, overload circuit-breakers O and $O'$ in series, conductor 23, actuating-coils of elements $c'$ and $c^2$, conductor 24, actuating-coil of element $c^{17}$, conductor 17', fixed contact 17, movable contacts $17^b$ and $t^b$, fixed contact $t^2$ to main $T^2$. This closes the switches of the elements $c'$, $c^2$, and $c^{17}$, thereby setting the underload-switches $u$ and $u'$; but in this first position of the master-controller no current flows through the motor-circuits. When the master-controller is moved to its second operative position, current flows through the main master-controller circuit as follows: from main $T'$, fixed contact $t'$, movable contact $t^a$, where it divides, part flowing through the following circuit: movable contact $1^a$, fixed contact 1, conductor $1'$, underload-switch $u$, conductor $2'$, overload circuit-breakers O and $O'$ in series, conductor 23, actuating-coils of controller elements $c'$ and $c^2$, conductor 24, actuating-coil of element $c^{17}$, underload-switch $u'$, conductor 16', fixed contact 16, movable contacts $16^b$, fixed contact $t^2$ to main $T^2$, while a branch circuit leads current from the movable contacts $t^a$ and $3^a$ of the master-controller through fixed contact 3, conductor $3'$, actuating-coils of elements $c^{14}$ and $c^{13}$, conductor $4'$, resistance $r^8$, fixed contact 4, movable contacts $4^b$ and $t^b$, fixed contact $t^2$ to main $T^2$. The switches of the elements already operated are thus maintained in a closed position and in addition the switches of the elements $c^{13}$ and $c^{14}$ are closed, thereby completing the auxiliary-motor circuit as follows: from main $T'$ through conductor 20, actuating-coil of the overload circuit-breaker O, conductor 21, switches of controller elements $c'$ and $c^2$ in parallel, conductor 30, switches of the elements $c^{13}$ and $c^{14}$ in parallel, resistances $R^{10}$ to $R'$, inclusive, in series, actuating-coil of the overload circuit-breaker $O'$, armature of auxiliary motor $M^2$, switch of element $c^{17}$ to main $T^2$. The auxiliary motor $M^2$ will now start slowly. When the master-controller is turned into its third operative position, the element $c^9$ will be operated, as will be seen readily by tracing out the controller-circuit corresponding to this position of the master-controller, thereby closing the switch of said element and short-circuiting the resistances $R^7$ to $R^{10}$, inclusive, and increasing the speed of the auxiliary motor. The auxiliary motor is further increased in speed by short-circuiting the remaining resistances $R'$ to $R^6$, inclusive, by successive steps until the master-controller is in its seventh operative position. If during the time that the auxiliary motor is in circuit the current rises above a predetermined amount, the overload circuit-breaker $O'$, which is set to operate at a much lower current than the circuit-breaker O, is actuated to open the main master-controller circuit, (shown clearly in Fig. 2,) thereby opening the motor-circuit at the controller elements. Should the current fail, the underload-switches $u$ and $u'$ would operate by gravity to open the said controller-circuit and maintain said circuit open until the master-controller was moved to its first operative position. As the master-controller is moved up to its seventh operative position the resistances A are gradually cut out of the field-circuit of the main motor, although the armature of that motor is receiving no current at the time. The reason for cutting out the said resistances A gradually is to avoid the arcing which might occur if the resistances A were cut out suddenly. When the master-controller is moved into its eighth operative position, the auxiliary motor is cut out of circuit and the main motor $M'$ cut into circuit, the field of the latter motor having been previously increased to its maximum strength. The controller-circuits in this position may be traced as follows: from the main $T'$ through switch $s'$, fixed contact $t'$, movable contacts $t^a$ and $1^a$, fixed contact 1, conductor $1'$, underload-switch $u$, conductor $2'$, overload circuit-breakers O and $O'$ in series, conductor 23, actuating-coils of elements $c'$ and $c^2$, conductor 24, actuating-coils of elements $c^{15}$ and $c^{16}$, conductor $15'$, fixed contact 15, movable contacts $15^b$ and $t^b$, fixed contact $t^2$, switch $s^2$ to main $T^2$, also branching from the conductor $1'$ through conductor 31, actuating-coil of element $c^6$, conductor $8'$, resistance $r^3$, fixed contact 8, movable contacts $8^b$ and $t^b$, fixed contact $t^2$ to main $T^2$. It will be seen that the circuit through element $c^{17}$ is broken in moving from position seven to position eight, thereby cutting out the auxiliary motor, and the switches of elements $c^6$, $c^{15}$, and $c^{16}$ are closed, thereby cutting in the main motor $M'$. The circuit through the main motor may be traced as follows: from the main $T'$, conductor 20, actuating-coil of overload circuit-breaker O, conductor 21, switches of elements $c'$ and $c^2$ in parallel, conductor 30, switch of element $c^6$, resistances $R^4$ to $R^{10}$, inclusive, armature of motor $M'$, switches of elements $c^{15}$ and $c^{16}$ in parallel to main $T^2$. As the master-controller is moved forward into its fifteenth position the remaining low-resistance sections $R^4$ to $R^{10}$, inclusive, of the rheostat R are successively short-circuited and the motor increased in speed. The fifteenth position of the master-controller is the normal working position with all the resistance-sections cut out and the main motor-field of maximum strength. If it is desired to increase further the speed of the motor for any reason, the resistances A are cut into the field-circuit step by step by a forward movement of the master-controller, thereby reducing the field strength and increasing the speed of the motor, the movable contacts $F^a$ to $F^e$, inclusive, coacting with the fixed contacts $F'$ to $F^5$, inclusive, for this purpose.

In Figs. 2 and 3 we have shown diagrammatically the various control-circuits through the actuating-coils of the elements of the motor-controller. In Fig. 2 we have shown the main control-circuit, which is opened when the overload and underload circuit-opening devices are operated, and in Fig. 3 the remaining control-circuits, which include the actuating-coils of the elements which control the completion of the motor-circuits and the resistance-sections of the rheostat R.

As can be clearly traced on Fig. 2, the movement of the master-controller into its first operative position completes the first control-circuit through the actuating-coils of the elements $c'$, $c^2$, and $c^{17}$, thereby closing the switches of said elements and setting the underload-switches $u$ and $u'$.

In the second position of the master-controller and in all subsequent positions the main control-circuit receives current through conductor $1'$, connected with the master-controller, and the said current returns to the master-controller through the actuating-coil of the motor-controller element $c^{17}$, underload-switch $u'$, and conductor $16'$ when the auxiliary motor is to be connected in circuit and through the actuating-coils of elements $c^{15}$ and $c^{16}$ and conductor $15'$ when the main motor is to be connected in circuit. It will therefore be seen that for every operative position of the master-controller other than its initial and first operative positions the overload-switches O and $O'$ and the underload-switch $u$ are in circuit, the underload-switch $u'$ being included in said main control-circuit only when the auxiliary-motor circuit is to be completed. When the switches of the elements $c'$ and $c^2$ are opened, the motors are deprived of current; therefore since the said switches are maintained closed by the energizations of the actuating-coils of said elements, the said coils being included in the said main control-circuit, the opening of said control-circuit for any reason whatever will immediately cause the motor-circuits to be opened at the elements $c'$ and $c^2$.

Simultaneously with the completion of the main control-circuit through the conductors $1'$ and $16'$ a control-circuit is completed through the conductors $3'$ and $4'$ and actuating-coils of the elements $c^{13}$ and $c^{14}$, (see Fig. 3,) thereby connecting the auxiliary motor in series with all the resistance-sections of the rheostat R. The next movement of the master-controller forward completes a control-circuit through the actuating-coil of resistance-controlling element $c^9$ by connecting the conductors $3'$ and $13'$ to the mains. A further forward movement of the master-controller completes a control-circuit through the conductors $1'$ $3'$, actuating-coil of element $c^6$, and conductor $8'$, thereby closing the switch of said element $c^6$ and short-circuiting the low-resistance sections $R^4$ to $R^{10}$, inclusive, of the rheostat R, and leaving only the high-resistance sections $R'$, $R^2$, and $R^3$ in circuit with the auxiliary motor. The next movement of the master-controller completes the circuit through conductor 31, actuating-coils of elements $c^5$ and $c^6$, conductor $7'$, thereby actuating the switch of element $c^5$ and cutting out resistance-section $R^3$. Further movement of the controller cuts out successively the sections $R^2$ and $R'$, controlled by the elements $c^4$ and $c^3$, respectively. In the last-mentioned position of the master-controller all resistance is cut out of the auxiliary-motor circuit, and since the resistance of each one of the sections $R'$, $R^2$, and $R^3$ is equal approximately to three of the low-resistance sections $R^4$ to $R^{10}$, inclusive, it will be seen that the resistance has been cut out of the auxiliary-motor circuit by approximately equal steps and the auxiliary motor given a uniform acceleration. The next forward movement of the master-controller disconnects the auxiliary motor from circuit and connects the main motor in circuit with the low-resistance sections $R^4$ to $R^{10}$, inclusive, of the motor-controller R by opening the circuit through the actuating-coils of the elements $c^3$ and $c^{17}$ and completing circuits through the actuating-coils of the elements $c^6$, $c^{15}$, and $c^{16}$ by connecting the conductors 31 and $8'$ to actuate element $c^6$ and conductor 24, which leads from element $c^2$, and conductor $15'$ in circuit with the master-controller. The next step of the master-controller completes circuit through conductors 31 and $9'$, thereby actuating element $c^7$ and cutting out the low-resistance section $R^4$, allowing the motor $M'$ to increase in speed. The next position completes a circuit through the conductors $3'$ and $10'$, thereby actuating the switch of element $c^8$ and cutting out the resistance-section $R^5$. On further movement of the master-controller one step forward a circuit is completed through conductors $4'$ and $13'$ and conductor $10'$ is disconnected. The element $c^9$ thereby operates to cut out resistance-section $R^6$. The element $c^{10}$ is operated by completing a control-circuit through conductor 31, actuating-coils of elements $c^7$, $c^8$, and $c^{10}$, and conductor $11'$ on the next position of the controller. On moving into the following position of the master-controller—viz., the thirteenth position—the actuating-coil of element $c^{11}$ is connected into the last-mentioned control-circuit by completing the said circuit through conductor $12'$ instead of $11'$, thereby actuating the switch of element $c^{11}$ and cutting out resistance-sections $R^8$. The next position completes a control-circuit through conductors $4'$, actuating-coils of elements $c^9$ and $c^{12}$, and conductor $14'$, thereby operating the switch of element $c^{12}$ to cut out the low-resistance section $R^9$. Upon movement of the master-controller into its fifteenth position—the normal running position for the main motor—the switches of elements $c^{13}$ and $c^{14}$ are simultaneously operated by the completion of the control-circuit through conductors $3'$ and $4'$ and actuating-coils of elements $c^{13}$ and $c^{14}$. In this last-mentioned position all the resistance is cut out of the main-motor circuit, said circuit being completed through the switches of elements $c^{13}$ and $c^{14}$ in parallel and switches of elements $c^{15}$ and $c^{16}$ in parallel. On moving the controller from the fifteenth to the twentieth positions the field of the main motor is diminished, as before explained.

The resistances $r'$ to $r^8$, inclusive, are used to limit the flow of current through the actuating-coils of the motor-controller elements when but a few actuating-coils are connected in series in the control-circuits. When several coils are connected in series, no extra resistance is inserted in the control-circuit, as the coils themselves act to limit the flow of current.

The overload circuit-breaker O is adapted to protect the main motor $M'$ in case of an excessive current in the motor-circuit by opening the main master-controller circuit, and the underload-switch $u$ is adapted to open by gravity in case of a failure of voltage and to remain open until the master-controller has been moved back to its initial or first operative position. The underload-switch $u'$ is so connected in the main control-circuit that when once opened it is impossible to reset it without returning to the initial or first operative position of the master-controller, and therefore since the said overload-switch is opened when the main motor is cut into circuit on the forward movement of the master-controller it becomes possible to return the master-controller to its initial position from any position above the seventh without connecting the auxiliary motor in circuit.

What we claim as new, and desire to secure by Letters Patent of the United States, is—

1. In a motor-control system, a plurality of motors, a rheostat, and a controller adapted during a movement in one direction to cause said rheostat to be connected in circuit with each of said motors successively.

2. In a motor-control system, a main motor, an auxiliary motor, a rheostat, and a motor-controller adapted to connect each of said motors in circuit with said rheostat successively and independently, and means for controlling the operation of said motor-controller from a distant point.

3. In combination, a motor-controller, a control-circuit for said controller, a master-controller in said circuit, a plurality of motors controlled by said motor-controller, and a rheostat adapted to be inserted in circuit with each of said motors successively.

4. In combination, a main motor, an auxiliary motor, a rheostat, a motor-controller for connecting said rheostat in circuit with the auxiliary motor, gradually cutting out parts of said rheostat successively, disconnecting said auxiliary motor from the source of current-supply, inserting part of the resistance of said rheostat in the main-motor circuit and gradually cutting said resistance out of said main-motor circuit.

5. In combination, a main motor, an auxiliary motor, a rheostat, a motor-controller for connecting said rheostat in circuit with the auxiliary motor, gradually cutting out parts of said rheostat successively, disconnecting said auxiliary motor from the source of current-supply, inserting part of the resistance of said rheostat in the main-motor circuit and gradually cutting said resistance out of said main-motor circuit, and independent overload circuit-opening devices located in the main and auxiliary motor circuits.

6. In combination, a motor-controller, a control-circuit for said controller, a master-controller in said circuit, a plurality of motors controlled by said motor-controller, a rheostat adapted to be inserted in circuit with each of said motors successively, and independent overload circuit-opening devices located in the main and auxiliary motor circuits adapted to open the control-circuit.

7. In combination, a motor-controller, a control-circuit for said controller, a master-controller in said circuit, a plurality of motors controlled by said motor-controller, a rheostat adapted to be inserted in circuit with each of said motors successively, and independent underload circuit-opening devices for each of said motor-circuits adapted to open said control-circuit.

8. In combination, a motor-controller, a control-circuit for said controller, a master-controller in said circuit, a plurality of motors controlled by said motor-controller, a rheostat adapted to be inserted in circuit with each of said motors successively, independent overload circuit-opening devices located in the main and auxiliary motor circuits respectively adapted to open the control-circuit, and independent underload circuit-opening devices for each of said motor-circuits also adapted to open said control-circuit.

9. In a motor-control system, a main motor, an auxiliary motor, a motor-controller of the separately-actuated contact type, a master-controller for said motor-controller, and a rheostat adapted to be connected in circuit with each of said motors successively and independently by said motor-controller.

10. In a motor-control system, a controller, a plurality of motors capable of independent control by said controller, and circuit-opening devices located in each motor-circuit adapted to cause said circuits to be opened independently upon an excess of current in either of said circuits.

11. In a motor-control system, a controller, a main motor and an auxiliary motor controlled by said controller and independently-operative overload circuit-breaking devices located in each of the motor-circuits.

12. In combination, a motor-controller, a main motor and an auxiliary motor controlled by said motor-controller, a master-controller for said motor-controller, an overload circuit-breaking device in said main-motor circuit adapted to open said master-controller circuit, and an independent overload circuit-breaking device in the auxiliary-motor circuit also adapted to open said master-controller circuit.

13. In a motor-control system, a main motor, an auxiliary motor, a controller adapted to connect said auxiliary motor in circuit and thereafter to disconnect said auxiliary motor and connect said main motor in circuit, and means for preventing said auxiliary motor from being connected in circuit after said main motor has been disconnected, until the controller has been returned to its initial or first operative position.

14. In combination, a motor of large capacity, a motor of small capacity, a rheostat built up of high-resistance sections and low-resistance sections, and means for connecting said resistance-sections in circuit with the motor of small capacity so that current will flow through the entire rheostat, and for connecting the low-resistance sections in circuit with the motor of large capacity.

15. In combination, a motor of large capacity, a motor of small capacity, a rheostat composed of high and low resistance sections, and a controller for successively connecting the entire rheostat in circuit with said small motor, and the low-resistance sections of said rheostat in circuit with said large motor.

16. In a motor-control system, a plurality of motors of different capacities, in combination with a rheostat composed of high and low resistance sections, the whole of said rheostat being adapted to be connected in circuit with one of said motors, and the sections of low resistance being adapted to be connected in circuit with another of said motors.

17. In a motor-control circuit, a motor of large capacity, a motor of small capacity, a rheostat composed of high and low resistance sections, and a motor-controller having contacts constructed and arranged for connecting said rheostat in circuit with said motor of small capacity and gradually cutting out the resistance of said rheostat in substantially equal resistance steps, and also for connecting the low-resistance sections of the rheostat in circuit with the motor of large capacity and gradually cutting out said sections in substantially equal resistance-steps.

18. In a motor-control circuit, a motor of large capacity, a motor of small capacity, a rheostat composed of high and low resistance sections, a motor-controller for connecting said rheostat in circuit with said motor of small capacity, cutting out said resistance-sections in substantially equal resistance-steps, cutting in the low-resistance sections of said rheostat in circuit with said motor of large capacity, cutting out the motor of small capacity, and cutting out said low-resistance sections in substantially equal resistance-steps, to produce a uniform acceleration as said motors are successively cut into circuit, and a master-controller for said motor-controller.

In witness whereof we have hereunto set our hands this 3d day of May, 1902.

CHARLES E. BARRY.
WILLIAM O. MUNDY.

Witnesses:
EDWARD WILLIAMS, Jr.,
M. EDITH SILLIMAN.